United States Patent [19]

Warren et al.

[11] Patent Number: 6,019,558

[45] Date of Patent: Feb. 1, 2000

[54] NUT AND BOLT SECURING DEVICE

[75] Inventors: James J. Warren, Teaneck; John Lennon, Fair Lawn, both of N.J.

[73] Assignee: Lenwar, Inc., Teaneck, N.J.

[21] Appl. No.: 08/893,360

[22] Filed: Jul. 16, 1997

Related U.S. Application Data

[63] Continuation of application No. 08/399,456, Mar. 7, 1995, Pat. No. 5,649,797.

[51] Int. Cl.[7] .......................... F16B 39/10; F16B 39/284; F16J 15/00
[52] U.S. Cl. .......................... 411/192; 411/197; 411/204; 411/200; 285/89; 285/92
[58] Field of Search .................................. 411/120, 121, 411/191–194, 197–200, 204, 209–213; 285/89–92, 330

[56] References Cited

U.S. PATENT DOCUMENTS

| | | |
|---|---|---|
| 1,139,671 | 5/1915 | Goodall . |
| 1,639,407 | 8/1927 | Hutton . |
| 1,683,516 | 9/1928 | Adams ..................... 411/204 |
| 2,208,292 | 7/1940 | Hanson ................. 285/90 X |
| 2,400,338 | 5/1946 | Cadman ..................... 285/89 |
| 3,586,351 | 6/1971 | Vanderveen et al. . |
| 4,286,807 | 9/1981 | Bachli ................................... 411/193 X |
| 4,645,242 | 2/1987 | Coleman et al. . |
| 5,127,679 | 7/1992 | Pouplier . |
| 5,131,690 | 7/1992 | Mano . |
| 5,188,398 | 2/1993 | Parimore, Jr. et al. . |
| 5,350,200 | 9/1994 | Peterson et al. . |
| 5,362,111 | 11/1994 | Hargin ..................................... 285/92 |
| 5,388,866 | 2/1995 | Schlosser ............................ 411/121 X |

*Primary Examiner*—Neill Wilson
*Attorney, Agent, or Firm*—Brown Raysman Millstein Felder & Steiner LLP

[57] ABSTRACT

A nut and bolt securing device is disclosed to prevent loosening of the assembly due to environmental conditions. In a first version of the invention the two piece device is fitted over a nut and a portion of a bolt extending from the nut, the two sections of the device being secured together with set screws, with serrations within the device, and one or more set screws engaging the front end of the device. In a second version of the device a shelf like planar projection on the front end of the device engages a planar surface on a nut, again combining with the serrations within the device to prevent fastener loosening. The device is particularly described in use in conjunction with refrigerant system flare nuts so as to prevent loss of refrigerant at these flare nut unions.

34 Claims, 5 Drawing Sheets

NUT AND BOLT SECURING DEVICE

This application is a continuation of application Ser. No. 08/399,456, filed Mar. 7, 1995, now U.S. Pat. No. 5,649,797.

BACKGROUND

This invention relates to devices to prevent nut and bolt assemblies from loosening over time, and in particular to securing existing flare nut unions in refrigeration systems.

Standard nut and bolt assemblies are, of course, the mainstay fasteners employed for a virtual limitless number of applications. The instant invention addresses the common problem of preventing of loosening of these unions over time, and doing so in a simple, practical manner. This disclosure particularly addresses the often encountered problem of leaking flare nut unions in refrigeration systems. Refrigerant tubing is usually connected to various components in a refrigeration system by either soldering the union together, or by use of a fare nut. Since the flare nut provides a generally reliable fluid tight union it is often preferred as the simplest means for effecting a tubing connection. By the very nature of refrigeration systems, flare nut unions are subjected to a variety of environmental conditions which tend to reverse the torquing forces originally used to effect the union, resulting in refrigeration leaks at the joint. Unfavorable environmental conditions include frequently changing extremes of temperature conditions, and vibrations from refrigeration compressors, movement of trucks and automobiles, and the like. It would therefore be desirable to be able to add a device to existing flare nut unions to either prevent future refrigerant leakage, or to insure that a field repair of a leaking flare nut union is permanent.

Attempts have been made to help prevent leaks in fluid transfer unions, and various types of nut and bolt assemblies, as is evidenced by U.S. Pat. No. 4,645,242. In this Positive Lock High Pressure Mounting a bell-flared collar and compression nut assembly securing a fluid flow measuring device within a pipe is disclosed. In the event of high pressure disengagement of the collar and compression nut, significant disengagement of the assembly is prevented by an annular rib (60) connected to the cylindrical body portion (18), and end cap (66) secured to the compression nut forming a stop for the annular rib in the event of the assembly becoming disengaged.

Again, in U.S. Pat. No. 5,350,200 a tube coupling assembly for connecting first and second fluid-carrying tubes together is disclosed. Disengagement of the assembly is prevented by a plurality of circumferentially spaced and axially extending grooves within the barrel portion of a coupling nut. Similarly, in U.S. Pat. No. 5,188,398 a redundantly locked fluid coupling is disclosed which utilizes ratcheting teeth or sawtooth teeth in a circumferential surface of a coupling nut to prevent disengagement of a fluid coupling. In U.S. Pat. No. 5,131,690 a self locking connector is disclosed which prevents disengagement between two fluid carrying tubular members by interposing a collar having longitudinal slots in its forward end between the tubing to be temporarily interconnected.

Additional coupling locking devices are disclosed in U.S. Pat. Nos. 5,127,679; 3,586,351; 1,639,407; and 1,139,671. In U.S. Pat. No. 5,127,679 a bushing with inner toothing for locking a joint together is disclosed; U.S. Pat. No. 3,586,751 teaches locking nuts on a combination taper and standard threaded tube; U.S. Pat. No. 1,639,407 describes deformable grooves within a nut and bolt combination to effect a locking union; U.S. Pat. No. 1,139,671 discloses a locking union between two pipe threads in which the threads of one compression nut eventually distort within the threads of a second compression nut, effecting a locking of the joint. While these various devices disclose useful joint securing assemblies they do not address the simple, reliable nut and bolt securing device of the instant invention, and in particular to the prevention of leaks in existing flare nut unions.

It is therefore a primary object of the invention to provide a simple, reliable nut and bolt securing device.

A further object of the invention is to provide a nut and bolt securing device to secure existing nut and bolt installations.

An additional object of the invention is to provide an addition to standard flare nut assemblies to provide for repair of existing flare nut installations so as to prevent future problems due to refrigerant leakage.

An additional object of the invention is to provide a device for securing flare nut assemblies in a manner to reduce freeze-thaw loosening of said device.

SUMMARY

These objects and others are accomplished with the nut and bolt securing device of the invention. In copending application Ser. No., 08/381/223 filed, Jan. 31, 1996, now U.S. Pat. No. 5,520,421, issued May 28, 1996 a Fluid Tight Flare Nut Securing Assembly was disclosed. This prior invention describes modifying existing flare nuts so that they have a threaded, rearward extension for connection to a compression nut with a deformable ferrule in between. The prior invention further describes additional modifications for a standard flare nut, including versions of the invention combining fare nut and compression threads in one flare nut assembly; adding redundant compression ferrules and compression nuts to the assembly; providing redundant compression ferrules and compression nuts in counter rotation assembly.

These modifications of the standard flare nut provide a fluid tight flare nut union, but do not address correcting the problem with existing installations. It has been found that a simple, reliable device can be added to a flare nut union so as to prevent future fluid leaks at the union.

For example, a typically troublesome point in refrigeration systems often occurs at thermostatic expansion valves which have flare nut unions. The standard flare nut usually has a hexagonally shaped exterior surface for convenient connection to a wrench, with a rear ramp portion sloping in a cone shape from the hexagonal shape to the tubular opening within the flare nut which accommodates a copper refrigerant tube. the flare nut has internal flare threads for connection to mating external flare threads on a refrigerant outlet tube on the thermostatic expansion valve. The connection of the copper refrigerant tube is effected by first creating a flared end on the copper tube utilizing a standard flaring tool, then sliding the copper tubing into the flare nut, with the flare end of the tube within the internal flare threads of the flare nut, then threading the flare nut and refrigerant outlet tube on the thermostatic expansion valve together, which action secures the concave surface of the flared end of the copper tube to a mating frusto-conical convex end of the expansion valve refrigerant tube, providing a fluid tight refrigerant seal.

As explained above, the flare union at stressful joints, such as at the thermostatic expansion valve, can be a source of refrigerant leakage over a period of time. The instant invention provides a device for direct connection to existing flare nut unions, so that as repairs are effected to a refrigeration system, the securing device of the invention is simply secured to the existing flare nut, thereby preventing future problems at this same flare nut union. The nut and bolt securing device is essentially two separate half portion which are secured together over both the copper tube and the flare nut. In a preferred embodiment each half of the device has a right and a left side laterally extending projection, the projection having a hole therethrough for securing the two halves together with a left side set screw and a right side set screw. When the two halves are joined together a hole throughout the length of the device is formed. This hole is essentially two confluent holes—a larger diameter hole at the front of the device for accepting nuts of various shapes, including square shaped nuts, and hexagonally shaped nuts, as, for example, typical flare nuts, and a smaller diameter hole for accepting a length of a threaded bolt, or a tube such as a copper refrigerant tube. The section of the smaller diameter tube or bolt hole is preferably serrated along the length of both the top and bottom halves of the device. Near the front of the device, holes having an internal thread are provided to accommodate at least one set screw, or as many as six set screws. To use this version of the device of the invention, the front end of the device is secured over the flare nut, with the copper refrigerant tube slidably engaged within the device, the set screws on the left and right side laterally projecting arms are tightened, which causes the serrations within the tube hole of the device to firmly grasp the external surface of the refrigerant tube, and at least one set screw of the potential set of six set screws adjacent the front end of the device is tightened so as to make firm contact with a planar surface of one of the six such surfaces on the hexagonally shaped flare nut. These actions now result in a fluid tight flare nut union assembly which is positively prevented by the device from being loosened by environmental conditions.

Flare nut unions, such as the one described above, are usually made out of metals, as, for example, copper and brass. However, they can be made out of other materials such as plastic, in which case the serrations within the tube securing hole of the device can be replaced with a suitable elastomer liner so as to provide a frictional engagement of the external surface of a tube being secured by the device.

In a second version of the invention a shelf like projection extends from the front of the top portion of the two half portions comprising the device. As described for the first version of the invention two sets screws, one at the left side and one at the right side of the device, are tightened to secure the top and bottom halves together to form the complete device of the invention. As was the case with the first version, a tube securing hole is formed extending the length of the device excepting for the now extending shelf like portion of the top half of the device. To use the device, the copper refrigerant tube is slidably engaged within the tube hole of the device with the extending shelf like portion of the device now positioned in contact with one of the six planar surfaces of the flare nut. Again as was described for the first version of the invention, serrations extend the length of both the top and bottom sections of the surface of the tube hole within the device. Thus, when the pair of set screws tighten the top and bottom sections of the device together, the serrations provide a secure grasp of the external surface of the copper refrigerant tube, with the flare nut being prevented from counter rotating to the original tightening torque applied to secure the flare nut union by the shelf like projection of the device.

The versions of the nut and bolt securing device of the invention described above can, of course, find general utility for a wide variety of nut and bolt unions other than the flare nut union heretofore described in detail. For example, a typical nut and bolt assembly often has a portion of the bolt extending a spaced distance beyond the junction of the threaded union of the nut and bolt. Obviously the versions of the invention described above can also be employed on typical square shaped or hexagonally shaped nuts with the threaded rod portion of the bolt providing a direct analogy to a copper refrigerant tube. Thus the nut and bolt securing device of the invention can be usefully employed for generally securing nut and bolt fastening applications wherein preventing of the loosening of the union would be an important structural consideration.

BRIEF DESCRIPTION OF THE DRAWINGS

FIGS. 4, 4A and 4B illustrate a version of the invention in which the nut and bolt securing device has a front end, shelf like projection, wherein

DETAILED DESCRIPTION

Referring now to the drawings wherein like structures having the same function are denoted with the same numerals, in FIGS. 1, 1A, 1B, and 1C a version of the nut and bolt security device 10 of the invention is shown. The device consists of two sections, a bottom half 24 and a top half 23 which can be virtual mirror images of one another. The device 10 has lateral projecting arms 12 on both the left and right side of the device, both halves having these lateral projections 12. Each lateral projection has a hole therethrough for accepting and securing two set screws 14, one set screw for the left side of the device, and one set screw for the right side of the device. The half portion of the device generally designated the top 23 has a smooth walled hole 26 in each of its laterally projecting arms to accept the two set screws 14, whereas the holes 28 in the half 24 designated the bottom half to accommodate these two set screws 14 have internal threads. When the two half sections of the device are bought together, and the two set screws 14 are slotted into the smooth walled top section lateral arm holes 26, and are threadably secured within the internal threads of the bottom section lateral arm holes 28, a complete nut and bolt securing device 10 is formed. A channel running the length of the center portion of both halves of the device 10 now combine to form a hole throughout the length of this center portion of the device. This hole has two diameters in the same axial alignment; an enlarged diameter forming a recessed area 20 at the front opening to the device, and a smaller diameter hole 22. The purpose of the two different diameter holes is to provide for accepting nuts of various shapes in the enlarged front recessed area 20 of the device, with the smaller diameter hole slidably accepting the projecting end of bolts or tubes being secured by the nut.

Figure 1:
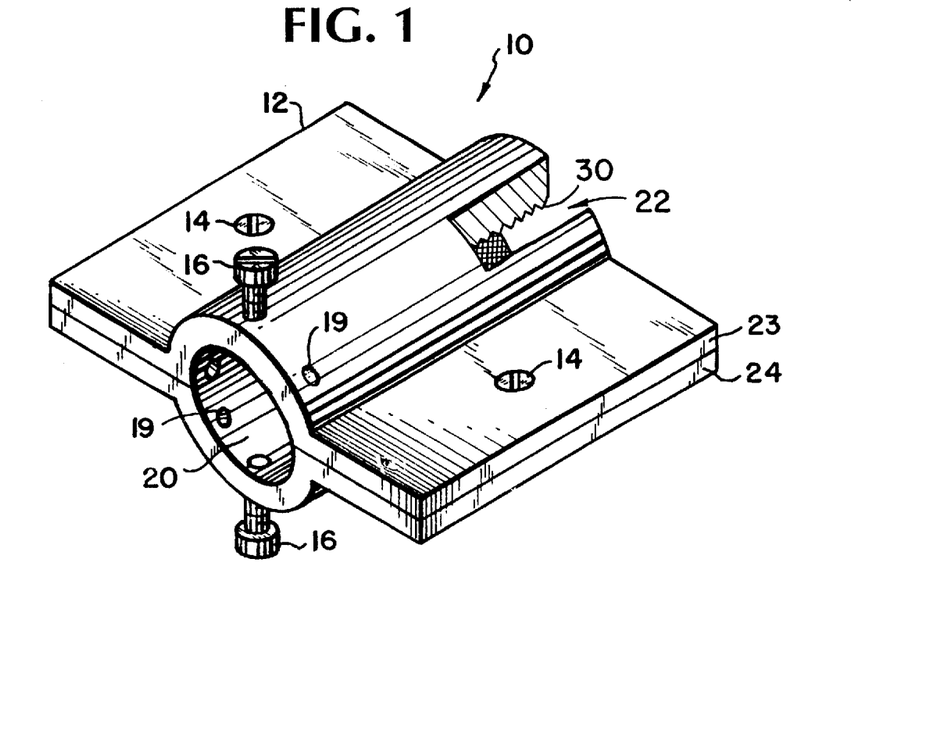
FIG. 1 is a side elevation, partially sectional perspective view of a version of the nut and bolt securing device of the invention.
Figure 1A:
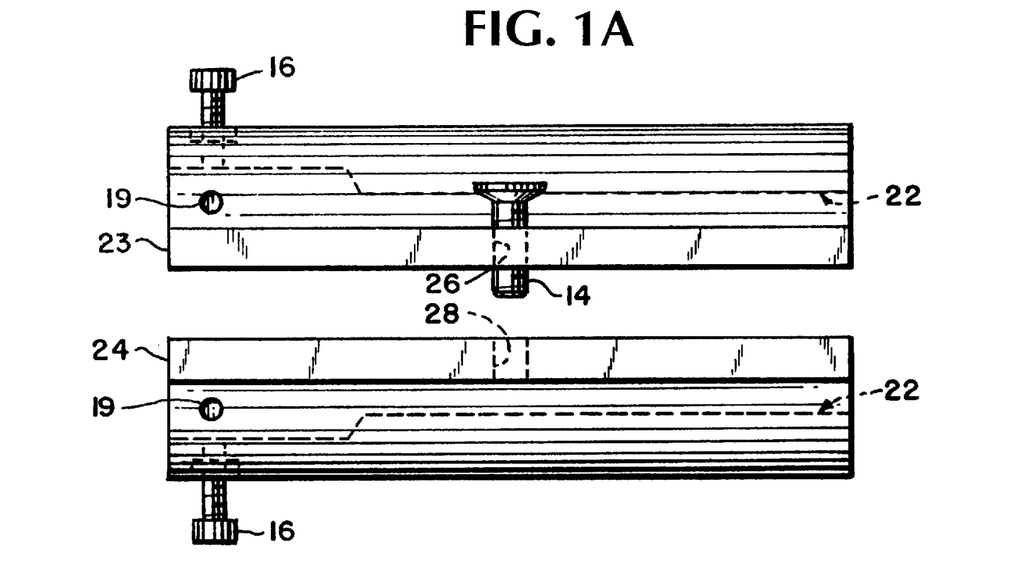
FIG. 1A is a side elevation, sectional view of the nut and bolt securing device of FIG. 1.
Figure 1B:
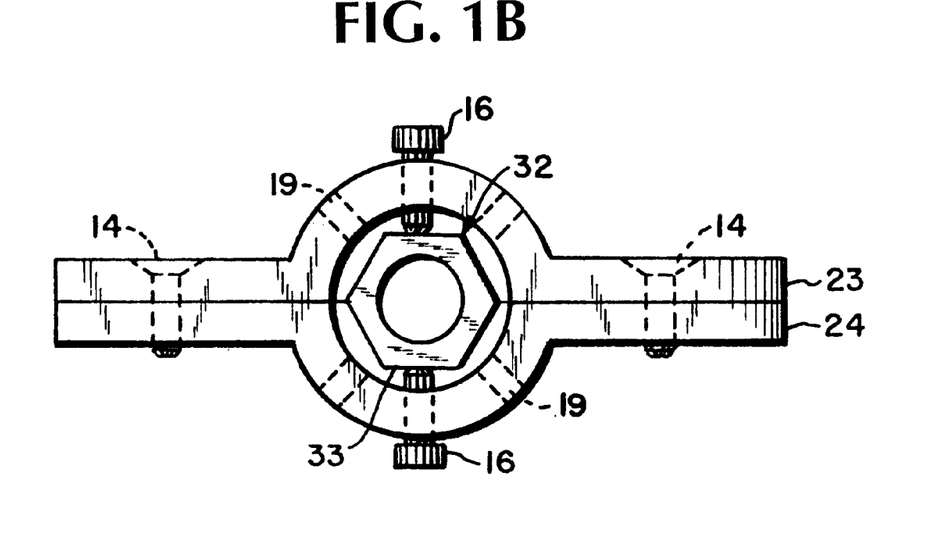
FIG. 1B is a front view of the device depicted in FIG. 1, illustrating set screws in contact with planar surfaces of a flare nut held within the device.
Figure 1C:
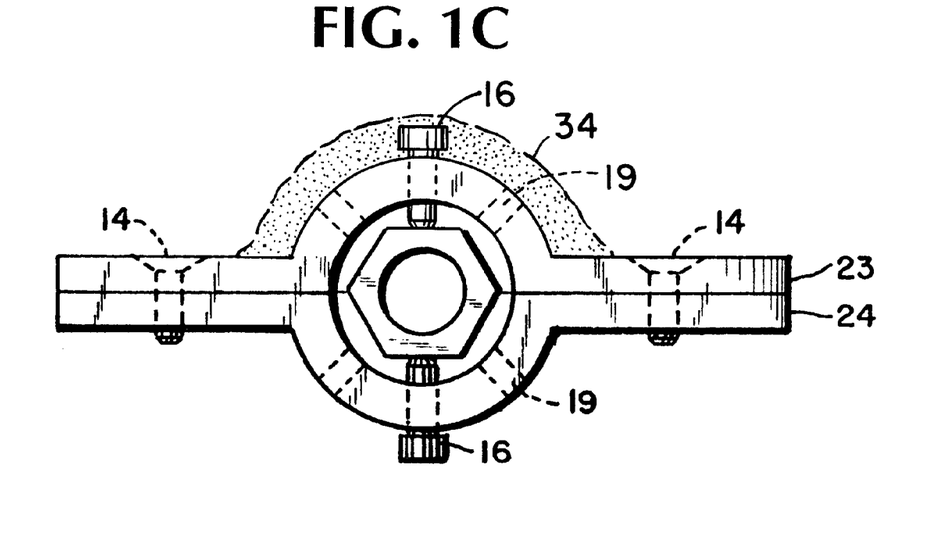
FIG. 1C illustrates sealing top threaded openings in the device from moisture accumulation.

The device succeeds in securing a nut and bolt union in counter rotation prevented assembly by locking the nut and bolt assembly and the device together. As can be clearly seen in FIGS. 1B and 1C, internally threaded holes 19 are provided adjacent the front end of the device, the holes 19 connecting the exterior of the device with the recessed area 20 within the device. Two set screws 16 are depicted threadably secured within the holes and contacting a planar surface 33 on a flare nut 32. The surface of the smaller diameter hole 22 within the device 10 has serrations 30 along its length on both halves of the device. As will be mode fully explained the front end set screws 16 and the serrations 30 within the tube hole cooperate to provide a locking relationship for the nut and bolt or nut and tube of the union. Six threaded front end holes 19 are shown in FIGS. 1B and 1C, so that as many as six set screws can be employed at one time. For most applications two front end set screws 16 suffice, so that the additional threaded holes 19 can serve as drain holes to prevent the accumulation of moisture in the union that can occur due to temperature variations. In actual day to day use it may not always be appreciated as to what is the top and what is the bottom of the device. As shown in FIG. 1C after a flare nut union is secured by the device, whatever section of the device that could be considered the top as far as gravity is concerned can have the front end set screw threaded openings 19 in this top section sealed water tight by means of a sealant 34 such as a silicone rubber adhesive sealant.

Figure 2:
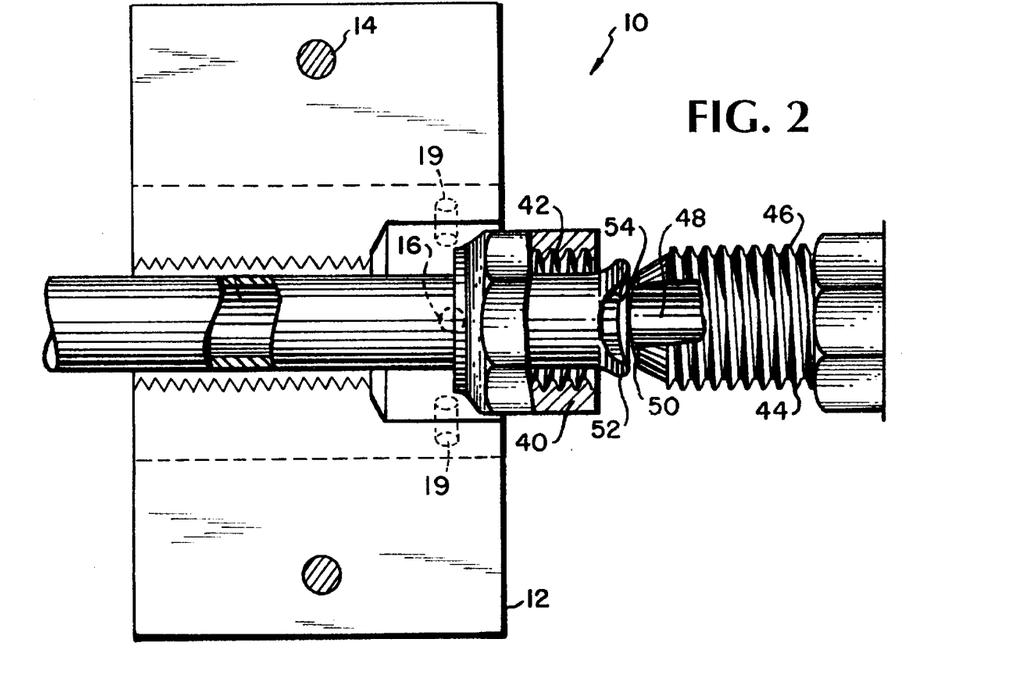
FIG. 2 is a top plan, exploded view of the version of the invention depicted in FIG. 1 as about to secure a flare nut union.
Figure 3:
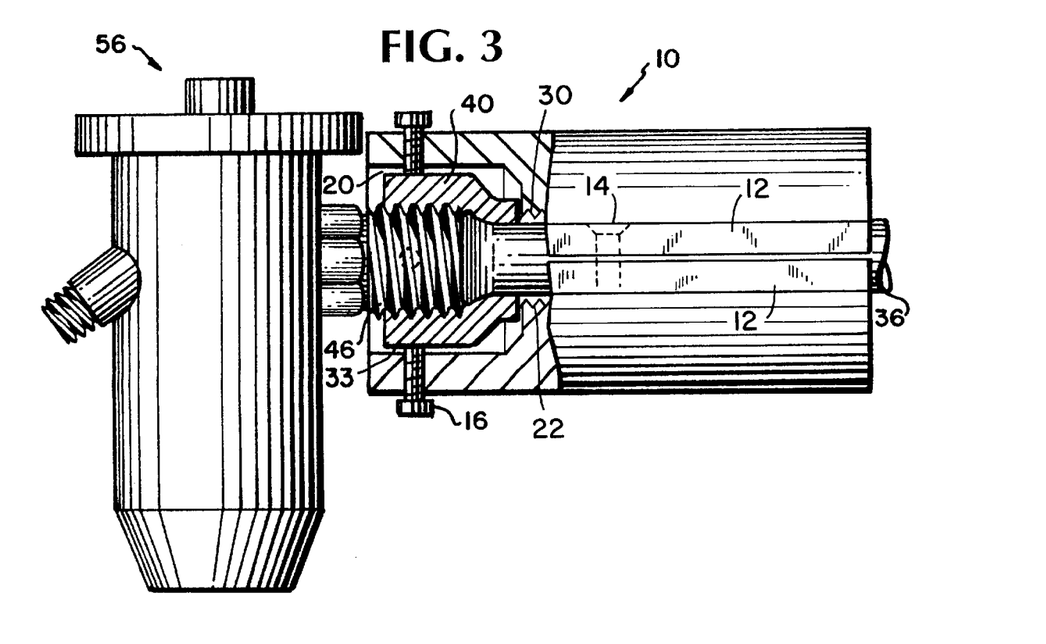
FIG. 3 is a side elevation, sectional view of a typical flare nut union as secured by a version of the nut and bolt securing device of the invention.

In FIG. 2 the device 10 of the invention is shown in place on a copper tube 36, which tube is about to be secured to a refrigerant outlet tube 46 on a thermostatic expansion valve 56 (FIG. 3) by means of a flare nut 40. This typical refrigeration system connection depicts a copper tube 36 having a flared end with a mating concave shape 54 to the frusto-conical convex shape 50 at the end of the refrigerant outlet tube 46. FIG. 3 illustrates the flare nut 40 as having secured the copper tube 30 and refrigerant outlet tube 46 together in a leak free flare nut union, so that refrigerant can now flow out of the thermostatic expansion valve 56, through hole 48 in the refrigerant outlet tube, and thence to the system via bore 38 in the copper tube. The device of the invention 10 is shown securing the flare nut 40 and copper tube 36 in a counter rotation preventing relationship. The front end set screws 16 firmly engage two planar surfaces 33 of the flare nut, while the set screws 14 in the lateral projecting arms of the device firmly secure the two halves of the device together, with the serrations on the surface of the smaller diameter hole 22 within the device securely grasping the external surface of the copper tube 36. In this manner field repairs can be made on existing flare nut installations, and the flare nut union secured against future leak problems by the addition of the nut and bolt securing device of the invention.

Figure 4:
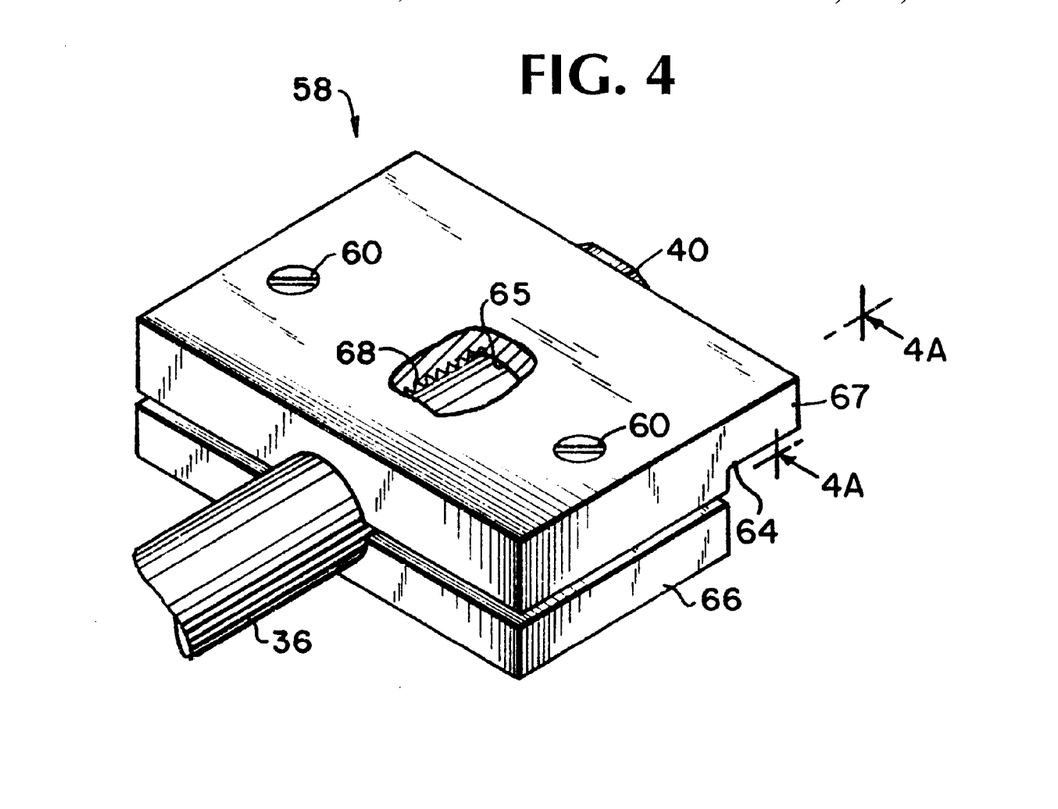
FIG. 4 is a top perspective, partially broken away view of the nut and bolt securing device of this version.
Figure 4A:
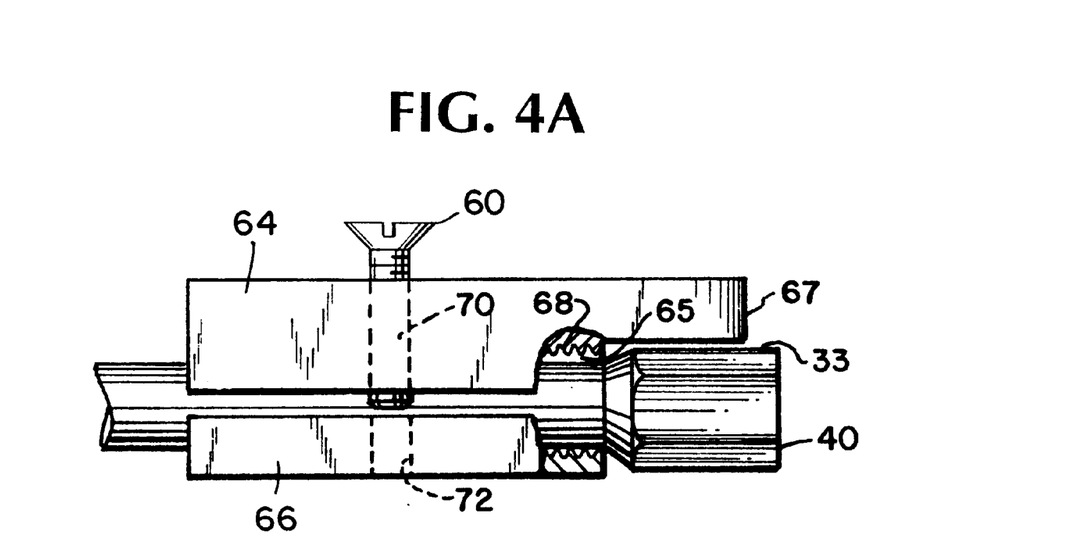
FIG. 4A is a side elevation and sectional view taken along line 4A—4A in FIG. 4.
Figure 4B:
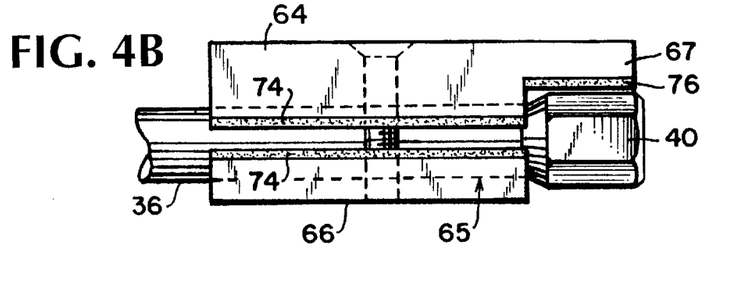
FIG. 4B is a side elevation view also showing the device sealed with sealing material.

In FIGS. 4, 4A, and 4B a second version 58 of the nut and bolt securing device of the invention is illustrated. As described above, this version is still a two piece construction, with a bottom half section 66 and a top half section 64. In this version 58 the device can be substantially rectangular in shape, with the two halves being secured together with a pair of set screws 80, one positioned at the left side and the other positioned on the right side of the device 58. Again as described for the first version 10, the holes 70 to accommodate the set screws in the top half 64 of the device can be smooth walled, with the holes 72 to accommodate these same set screws in the bottom half 66 of the device having internal threads. Similarly to the first version, once the two halves are joined together channels in the center portion of both halves now define a hole 65 running from the front to the back of the device. This hole also has serrations along the full length of the hole for both the top and bottom sections of the hole.

As illustrated in FIG. 4A, a front end shelf like projection extends forward from the top section, defining a planar overhanging surface above the opening of the hole 65 within the device. FIGS. 4, 4A, and 4B show a typical flare nut 40 and copper tube 36 as being secured by the device 58. In this version of the invention the hole 65 within the device extending from the front end to the rear end of the device is of only one diameter for slidably accommodating the diameter of a copper refrigeration tube 36. As in the first version of the invention securing the two halves of the device together by means of the left side and right side set screws 60 causes the serrations 68 within the hole 65 to firmly grasp the external surface of the copper tube. At the same time the overhanging planar projection 67 on the top half 64 of the device contacts, on its surface which faces the bottom half of the device, a planar surface 33 on the hexagonally shaped surface of the flare nut. This combination securing of the copper tube and the flare nut together with the device now serves to provide a flare nut union locked against counter rotation to the original torquing forces which effected the union.

In FIG. 4B the serrations within the bore of the tube hole 65 are replaced with a suitable elastomer liner 74 so as to provide a frictional engagement with a rod or tube, as, for example, when the device is fabricated from a suitable plastic material. Also in FIG. 4B, a shim 76 is depicted to illustrate the flexibility of the device in being able to accommodate nuts of varying dimensions.

Figure 5:
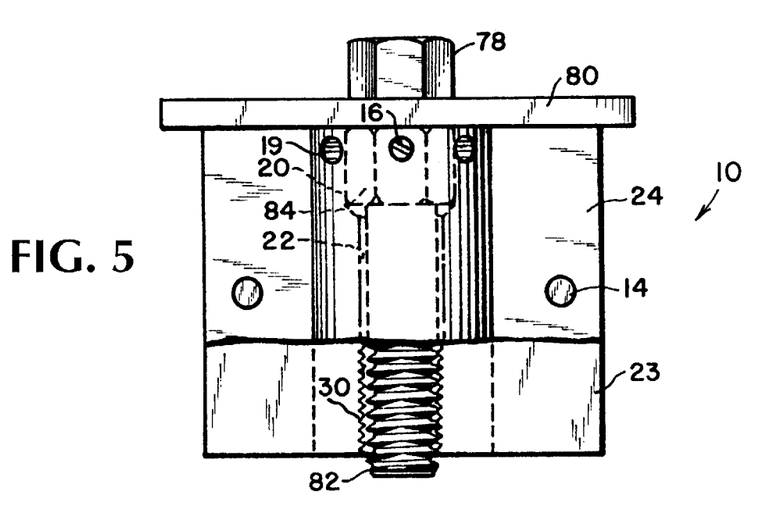
FIG. 5 is a top plan view of the nut and bolt securing device depicted in FIG. 1 securing a nut and bolt assembly.
Figure 5A:
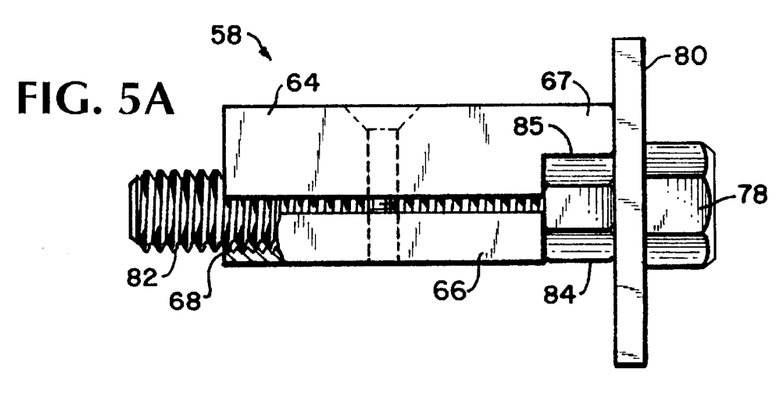
FIG. 5A is a side elevation view of the nut and bolt securing device depicted in FIG. 4 securing a nut and bolt assembly.

FIGS. 5 and 5A illustrate utilizing the first 10 and second 58 versions of the invention for general nut and bolt fastener security. In FIG. 5 a typical nut 84 and bolt 78 is shown as fastened to a panel 80. Loosening of this fastening by vibrations and other environmental factors can be prevented by securing the first version 10 of the invention over the threaded 82 section of the bolt with the front end recessed area 20 of the device engaging the nut, and being secured in this position by the front end set screws 16, while the threaded 82 section of the bolt is firmly secured within the hole 22 in the device, grasped by the serrations 30 lining this hole.

In FIG. 5A the second version 58 of the invention is shown securing the same nut and bolt fasteners depicted in FIG. 5. In this case the planar overhanging portion 67 of the top half of the device contacts a planar surface 85 on the nut which cooperates with the serrations 68 within the device which grasp the outer surface of the threaded section of the bolt 82, the combination serving to prevent loosening of the nut and bolt assembly due to environmentally induced conditions.

The nut and bolt securing device of the invention has been described as useful for securing flare nut unions, and would therefore be preferably fabricated in copper or brass. Depending on applications other metals can be similarly employed, or the device can be fabricated in plastic. Specific details of construction have been given, as, for example, having a pair of set screws hold the device together. Obviously, other equivalent structures can be used, such as a hinge and set screw combination, and similar substitutions.

While the present invention has been disclosed in connection with versions shown and described in detail, various modifications and improvements thereon will become readily apparent to those skilled in the art. Accordingly, the spirit and scope of the present invention is to be limited only by the following claims.

What is claimed is:

1. A device for preventing relative rotation between a nut threaded on a cylindrical member, the nut having internal threads and the cylindrical member having external threads, and the nut having a plurality of external wrenching surfaces, the device comprising at least two members adjustably secured together with a space therebetween, and being adapted to receive in the space and engage therein a portion of the cylindrical member extending from the nut to restrain the cylindrical member from rotating relative to the device when the device is adjusted, at least one of the device members also being adapted to extend over the nut to be engaged with at least one wrenching surface of the nut to also restrain the nut from rotating relative to the device, and thereby restrain relative rotation between the cylindrical member and the nut, when the device is adjusted.

2. The device according to claim 1 wherein the device comprises two members each have a longitudinally extending recess where the two members are adapted to engage the cylindrical member, the recesses being aligned to define a receptacle which receives and engages the cylindrical member when the device is adjusted.

3. The device according to claim 1 wherein the recesses each define a portion of a cylindrical space.

4. The device according to claim 3 including serrations extending along each recess.

5. The device according to claim 1 comprising a set screw threaded to the at least one member extending through the at least one member to where the at least one member is adapted to be engaged with at least one wrenching surface of the nut, the set screw being adapted to engage the at least one wrenching surface of the nut and thereby cause the at least one member to be engaged with nut.

6. The device according to claim 1 wherein the at least one member is configured to directly engage at least one wrenching surface of the nut when the device is adjusted, and thereby cause the at least one member to be engaged with the nut.

7. The device according to claim 6 wherein the at least one member includes a planar portion adapted to directly engage at least one wrenching surface of the nut when the device is adjusted, and thereby cause the at least one member to be engaged with the nut.

8. The device according to claim 2 wherein the two members are adapted to extend over the nut and the recess in each of the two members is adapted to extend over the nut to define a space adapted to receive the nut therein.

9. The device according to claim 7 comprising a set screw threaded to at least a first of the two members extending therethrough to the space which is adapted to receive the nut, the set screw being adapted to engage the at least one wrenching surface of the nut and thereby cause at least the first member to be engaged with the nut.

10. The device according to claim 1 wherein the device is fabricated in metal.

11. The device according to claim 1 wherein the device is fabricated in plastic.

12. The device according to claim 2 comprising at least one set screw adjustably securing the two members together.

13. The device according to claim 2 comprising a layer of elastomeric material affixed to each recess where the respective member is adapted to engage the cylindrical member.

14. The device according to claim 8 wherein the recesses each define a portion of a cylindrical space and the space adapted to receive the nut is cylindrical and larger in diameter than the cylindrical space adapted to receive the cylindrical member.

15. The combination of a nut, a cylindrical member to which the nut is threaded and a device for preventing relative rotation between the nut and the cylindrical member, the nut having internal threads and the cylindrical member having external threads, and the nut having a plurality of external wrenching surfaces, the device comprising at least two members adjustably secured together with a space therebetween in which is received and engaged a portion of the cylindrical member extending from the nut to restrain the cylindrical member from rotating relative to the device when the device is adjusted, at least one of the device members also being engaged with at least one wrenching surface of the nut to also restrain the nut from rotating relative to the device, and thereby restrain relative rotation between the cylindrical member and the nut, when the device is adjusted.

16. The combination according to claim 15 wherein the device comprises two members each have a longitudinally extending recess where the two members engage the cylindrical member, the recesses being aligned to define a receptacle which receives and engages the cylindrical member when the device is adjusted.

17. The combination according to claim 16 wherein the recesses each define a portion of a cylindrical space.

18. The combination according to claim 17 including serrations extending along each recess.

19. The combination according to claim 15 comprising a set screw threaded to the at least one member extending through the at least one member to where the at least one member is engaged with at least one wrenching surface of the nut, the set screw engaging the at least one wrenching surface of the nut and thereby causing the at least one member to be engaged with the nut.

20. The combination according to claim 15 wherein the at least one member is configured to directly engage at least one wrenching surface of the nut when the device is adjusted, and thereby cause the at least one member to be engaged with the nut.

21. The combination according to claim 20 wherein the at least one member includes a planar portion which directly engages at least one wrenching surface of the nut when the device is adjusted, and thereby cause the at least one member to be engaged with the nut.

22. The combination according to claim 16 wherein the two members extend over the nut and the recess in each of the two members extends over the nut to define a space which receives the nut therein.

23. The combination according to claim 22 comprising a set screw threaded to at least a first of the two members extending therethrough to the space which receives the nut, the set screw engaging the at least one wrenching surface of the nut and thereby cause at least the first member to be engaged with the nut.

24. The combination according to claim 22 wherein the recesses each define a portion of a cylindrical space and the space which receives the nut is cylindrical and larger in diameter than the cylindrical space which receives the cylindrical member.

25. The combination of a flare nut union nut and a device for preventing loosening thereof, the flare nut union comprising a first hollow tube having a first fluid passage, a second hollow tube having a second hollow passage, and a flare nut which secures the first and second hollow tubes together to connect the first and second fluid passages in a fluid-tight manner, the first and second hollow tubes having flared mating ends, the nut being slidably mounted to the second hollow tube configured to engaged the flared end of the second hollow tube and having an interior thread which engages an exterior thread on the first hollow tube, the device preventing relative rotation between the nut and the first hollow tube, the nut having a plurality of external wrenching surfaces, the device comprising at least two members adjustably secured together with a space therebetween in which is received and engaged a portion of the first hollow tube extending from the nut to restrain the first hollow tube from rotating relative to the device when the device is adjusted, at least one of the device members also being engaged with at least one wrenching surface of the nut to also restrain the nut from rotating relative to the device, and thereby restrain relative rotation between the first hollow tube and the nut when the device is adjusted.

26. The combination according to claim 25 wherein the device comprises two members each have a longitudinally extending recess where the two members engage the first hollow tube, the recesses being aligned to define a receptacle which receives and engages the cylindrical member when the device is adjusted.

27. The combination according to claim 25 wherein the recesses each define a portion of a cylindrical space.

28. The combination according to claim 27 including serrations extending along each recess.

29. The combination according to claim 25 comprising a set screw threaded to the at least one member extending through the at least one member to where the at least one member is engaged with at least one wrenching surface of the nut, the set screw engaging the at least one wrenching surface of the nut and thereby causing the at least one member to be engaged with the nut.

30. The combination according to claim 25 wherein the at least one member is configured to directly engage at least one wrenching surface of the nut when the device is adjusted, and thereby cause the at least one member to be engaged with the nut.

31. The combination according to claim 30 wherein the at least one member includes a planar portion which directly engages at least one wrenching surface of the nut when the device is adjusted, and thereby cause the at least one member to be engaged with the nut.

32. The combination according to claim 26 wherein the two members extend over the nut and the recess in each of the two members extends over the nut to define a space which receives the nut therein.

33. The combination according to claim 32 comprising a set screw threaded to at least a first of the two members extending therethrough to the space which receives the nut, the set screw engaging the at least one wrenching surface of the nut and thereby cause at least the first member to be engaged with the nut.

34. The combination according to claim 33 wherein the recesses each define a portion of a cylindrical space and the space which receives the nut is cylindrical and larger in diameter than the cylindrical space which receives the first hollow tube.

* * * * *